United States Patent
Wiebe

(10) Patent No.: US 8,381,012 B2
(45) Date of Patent: *Feb. 19, 2013

(54) APPARATUS AND METHOD FOR REDUNDANT AND SPREAD SPECTRUM CLOCKING

(75) Inventor: Garth Dylan Wiebe, Maynard, MA (US)

(73) Assignee: Stratus Technologies Bermuda Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/421,315

(22) Filed: Mar. 15, 2012

(65) Prior Publication Data

US 2012/0173916 A1  Jul. 5, 2012

Related U.S. Application Data

(63) Continuation of application No. 11/895,048, filed on Aug. 23, 2007, now Pat. No. 8,161,311.

(51) Int. Cl.
*G06F 1/00* (2006.01)

(52) U.S. Cl. ............ 713/501; 713/500; 713/600; 714/2; 714/100; 327/292

(58) Field of Classification Search .................. 713/500, 713/501, 600; 714/2, 100; 327/292
See application file for complete search history.

(56) References Cited

U.S. PATENT DOCUMENTS

| | | | | |
|---|---|---|---|---|
| 4,282,493 A * | 8/1981 | Moreau | ............................. | 331/2 |
| 4,667,328 A | 5/1987 | Imran | | |
| 5,422,915 A * | 6/1995 | Byers et al. | .................... | 375/357 |
| 5,852,728 A | 12/1998 | Matsuda et al. | | |
| 5,886,557 A * | 3/1999 | Wilcox | .......................... | 327/292 |
| 6,107,855 A * | 8/2000 | Wilcox | .......................... | 327/295 |
| 6,194,969 B1 * | 2/2001 | Doblar | .............................. | 331/2 |
| 6,516,422 B1 | 2/2003 | Doblar et al. | | |
| 6,687,851 B1 | 2/2004 | Somers et al. | | |
| 6,718,474 B1 | 4/2004 | Somers et al. | | |
| 6,813,721 B1 | 11/2004 | Tetreault et al. | | |
| 6,820,213 B1 | 11/2004 | Somers et al. | | |
| 6,931,087 B1 | 8/2005 | Karol | | |
| 6,948,010 B2 | 9/2005 | Somers et al. | | |
| 7,043,655 B2 | 5/2006 | Wu | | |
| 7,199,671 B2 * | 4/2007 | Wissell et al. | .................... | 331/2 |
| 7,321,244 B2 | 1/2008 | Kobayashi | | |
| 7,334,149 B1 | 2/2008 | Wu | | |
| 7,562,247 B2 | 7/2009 | Baker et al. | | |

(Continued)

OTHER PUBLICATIONS

Analog Devices: Dual Input Network Clock Generator/Synchronizer, Aug. 2007—Revision 0: Initial Version. Retrieved from the Internet: http://www.analog.com/static/imported-files/data_sheets/AD9549.pdf.

*Primary Examiner* — Jaweed A Abbaszadeh
(74) *Attorney, Agent, or Firm* — K&L Gates LLP

(57) ABSTRACT

An apparatus and method for fault-tolerant and spread spectrum clocking. In one embodiment a master clock synthesizer circuit generates an output clock signal of varying frequency within a predetermined range of frequencies. A slave clock synthesizer circuit is provided to track the output clock signal generated by the master clock synthesizer circuit. If the master clock synthesizer circuit fails or generates an invalid output clock signal, the slave clock synthesizer circuit takes over and functions as the master clock synthesizer circuit. In one embodiment a method of fault-tolerant spread spectrum clocking includes generating a first digital data stream; receiving the first digital data stream, a first input reference signal and a first clock signal in a master clock synthesizer circuit; generating an first output clock signal of varying frequency by the master clock synthesizer circuit in response to the first digital data stream and the first clock signal.

22 Claims, 4 Drawing Sheets

U.S. PATENT DOCUMENTS

| | | |
|---|---|---|
| 2005/0012525 A1 | 1/2005 | Starr et al. |
| 2006/0221070 A1 | 10/2006 | Kobayashi |
| 2006/0222125 A1 | 10/2006 | Edwards, Jr. et al. |
| 2007/0043972 A1 | 2/2007 | Graham et al. |
| 2007/0174687 A1 | 7/2007 | Graham et al. |
| 2007/0294561 A1 | 12/2007 | Baker et al. |
| 2008/0129351 A1 | 6/2008 | Chawla |
| 2008/0231331 A1 | 9/2008 | Balraj et al. |
| 2009/0033380 A1 | 2/2009 | McCoy |

\* cited by examiner

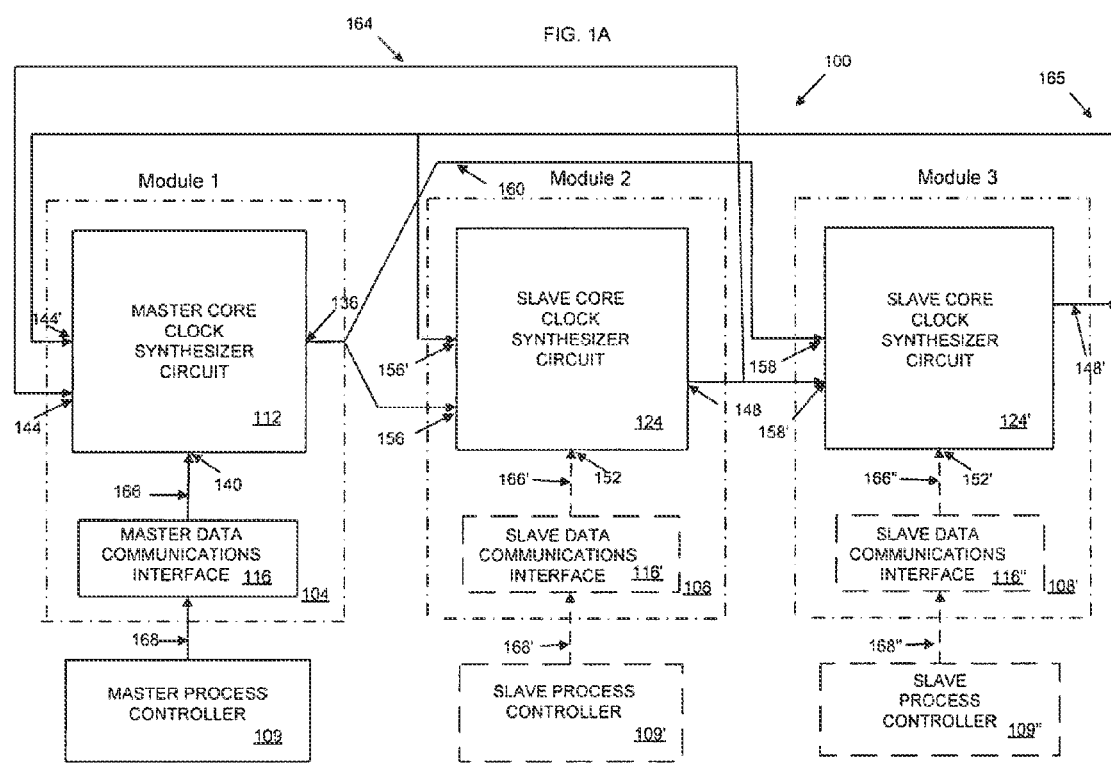

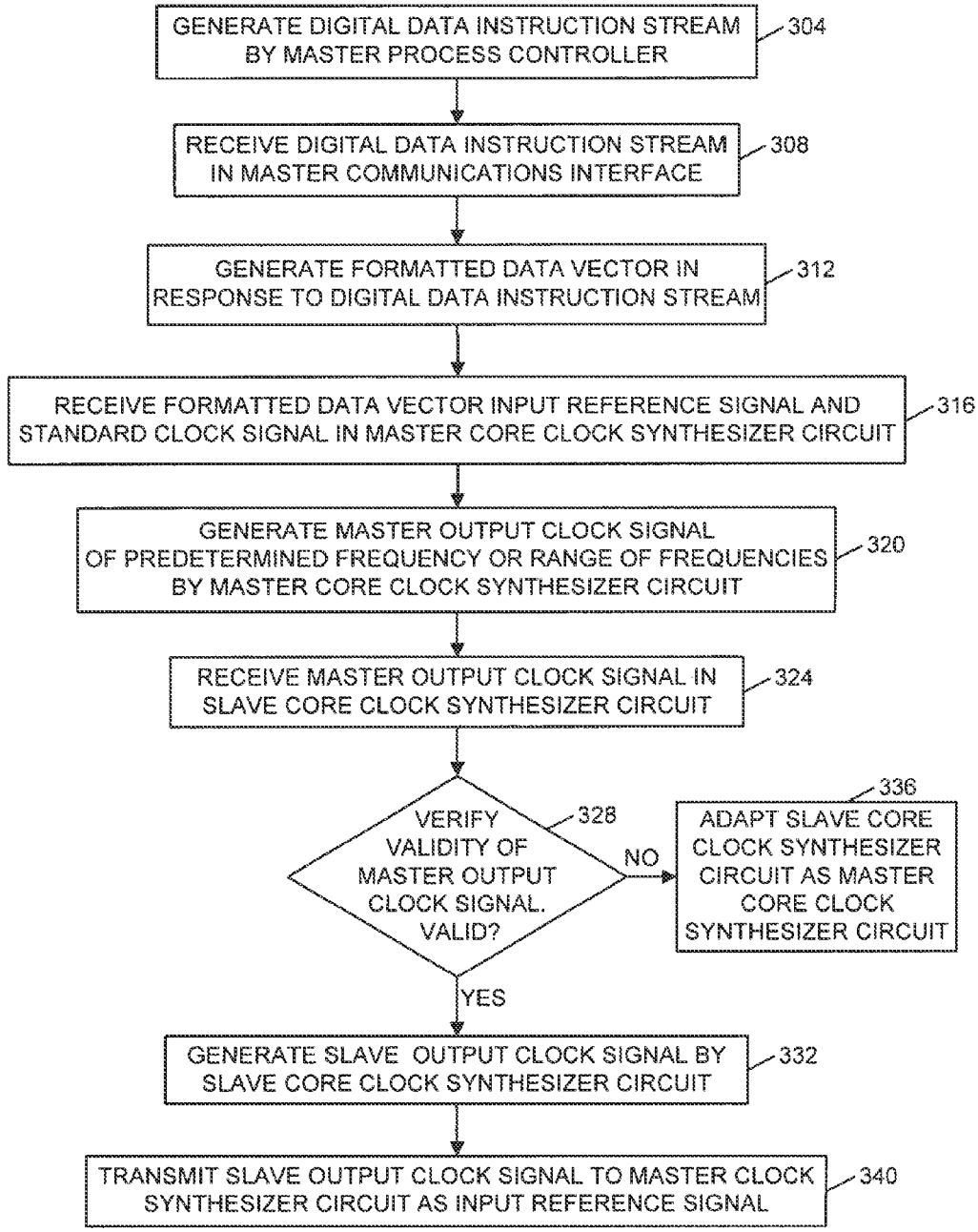

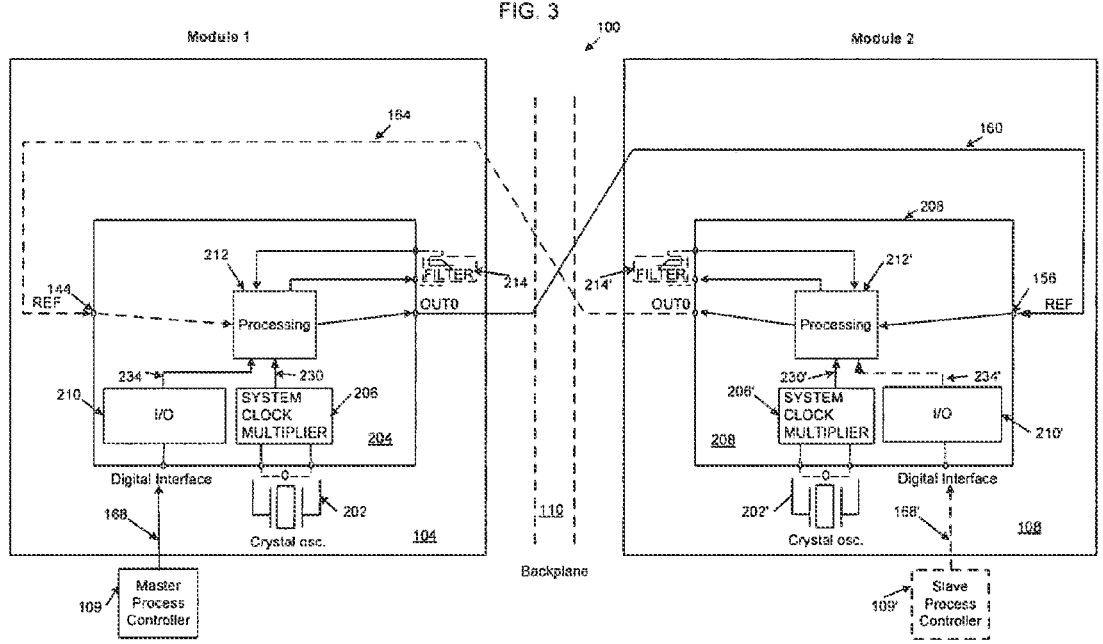

APPARATUS AND METHOD FOR REDUNDANT AND SPREAD SPECTRUM CLOCKING

CROSS-REFERENCE TO RELATED APPLICATIONS

This application is a continuation of U.S. patent application Ser. No. 11/895,048 filed on Aug. 23, 2007, the entire disclosure of which is incorporated by reference herein for all purposes.

FIELD OF THE INVENTION

The present invention relates generally to techniques for implementing fault tolerant clocking of computer systems, and more particularly to an apparatus and method for fault-tolerant spread spectrum clocking,

BACKGROUND OF THE INVENTION

With recent advances in technology, computers have been increasingly used to operate critical applications in a variety of fields. These critical applications may affect millions of people and businesses everyday. For example, some of these applications may include providing and maintaining an accurate system for financial markets, monitoring and controlling air traffic, regulating power generation facilities and assuring the proper functioning of life-saving medical devices. It is a crucial requirement of these systems that they remain operational at all times. Despite significant advancements in the development of technologies to minimize failures, computer-based systems still occasionally fail. In many such systems, clocking circuits are critical single points of failure. As a result, there is the problem of addressing faults in mission critical clocking circuits without affecting the state of the computer system. The present invention addresses this issue.

SUMMARY OF THE INVENTION

In one aspect, the present invention relates to a method of fault-tolerant clocking. In one embodiment, the method includes the steps of generating, by a first process controller, a first digital data value; receiving the first digital data value, a first input reference signal and a first clock signal in a master clock synthesizer circuit; generating a first output clock signal of a predetermined frequency by the master clock synthesizer circuit in response to the first digital data value and the first clock signal. The first output clock signal of the master clock synthesizer circuit and a second clock signal is received in a slave clock synthesizer circuit. The method includes generating a second output clock signal by the slave clock synthesizer circuit in response to the first output clock signal of the master clock synthesizer circuit and the second clock signal; and transmitting the second output clock signal of the slave clock synthesizer circuit to the master clock synthesizer circuit as the first input reference signal.

In one embodiment the method further includes the step of verifying the validity of the first output clock signal of the master clock synthesizer circuit. In another embodiment the method further includes the step of performing the function of the master clock synthesizer circuit by the slave clock synthesizer circuit, if the first output clock signal is deemed invalid. In yet another embodiment, the method further includes the step of performing the function of the master clock synthesizer circuit by the slave clock synthesizer circuit, if the master clock synthesizer circuit fails. In still yet another embodiment the method includes the step of tracking the first output clock signal of the master clock synthesizer circuit by a second slave clock circuit. In another embodiment the step of generating a first output clock signal of a predetermined frequency by the master clock synthesizer circuit is further in response to the first input reference signal. In yet another embodiment the method further includes the step of generating, by a second process controller, a second digital data value.

In another aspect the invention relates to a fault-tolerant clocking apparatus. In one embodiment the apparatus includes a first clock synthesizer circuit configured to receive a first input reference signal, a first digital data value and a first clock signal and generate a first output clock signal of a predetermined frequency response to the first digital data value and the first clock signal, and a second clock synthesizer circuit in data communication with the first clock synthesizer circuit configured to receive the first output clock signal of the first clock synthesizer circuit and a second clock signal and generate a second output clock signal in response to the first output clock signal and the second clock signal, wherein the first clock synthesizer circuit is further configured to receive the second output clock signal as the first input reference signal.

In another embodiment the second clock synthesizer circuit is further configured to verify the validity of the first output clock signal of the first dock synthesizer circuit. In another embodiment the second clock synthesizer circuit is further configured to perform the function of the first clock synthesizer circuit, if the first output clock signal is deemed invalid. In still yet another embodiment the second clock synthesizer circuit is further configured to perform the function of the first clock synthesizer circuit, if the first clock synthesizer circuit fails. In another embodiment the apparatus includes a first process controller configured to generate the first digital data value and a second process controller configured to generate a second digital data value. In another embodiment the second clock synthesizer circuit is further configured to receive the second digital data value.

In another aspect the invention relates to a fault-tolerant clocking apparatus including a first process controller configured to generate a first digital data value; a data control port in data communication with the process controller configured to receive the first digital data value and generate a first formatted data value in response to the first digital data value. A core clock synthesizer circuit is in data communication with the data control port configured to receive the first formatted data value and a first clock signal and generate an output clock signal of a predetermined frequency within a predetermined range of frequency values in response to the first formatted data value and the first clock signal.

In yet another aspect the invention relates to a method of fault-tolerant clocking. In one embodiment the method includes the steps of generating, by a first process controller, a first digital data value; receiving the first digital data stream in a data control port; generating a first formatted data value in response to the first digital data value; receiving the first formatted data value and a first clock signal in a core clock synthesizer circuit; and generating an output clock signal of a varying frequency within a predetermined range of frequency values in response to the first formatted data value and the first clock signal.

In another aspect, the invention relates to a method of fault-tolerant spread spectrum clocking. In one embodiment the method includes the steps of generating, by a first process controller, a first digital data stream; receiving the first digital data stream, a first input reference signal and a first clock signal in a master clock synthesizer circuit; generating a first output clock signal of a varying frequency by the master clock synthesizer circuit in response to the first digital data stream and the first clock signal; receiving the first output clock signal of the master clock synthesizer circuit and a second clock signal in a slave clock synthesizer circuit; generating a second output clock signal of varying frequency by the slave clock synthesizer circuit in response to the first output clock signal of the master clock synthesizer circuit and the second clock signal; and transmitting the second output clock signal of the slave clock synthesizer circuit to the master clock synthesizer circuit as the first input reference signal.

In still yet another aspect the invention relates to a fault-tolerant spread spectrum clocking apparatus. In one embodiment the apparatus includes a first clock synthesizer circuit configured to receive a first input reference signal, a first digital data series and a first clock signal and generate a first output clock signal of a varying frequency in response to the first digital data value and the first clock signal, and a second clock synthesizer circuit in data communication with the first clock synthesizer circuit configured to receive the first output clock signal of the first clock synthesizer circuit and a second clock signal and generate a varying second output clock signal in response to the first output clock signal and the second clock signal, wherein the first Clock synthesizer circuit is further configured to receive the second output clock signal as the first input reference signal.

In yet another aspect the invention relates to a method of fault-tolerant spread spectrum clocking. In one embodiment the method includes the steps of generating, by a first process controller, a first digital data stream having a plurality of values; receiving the first digital data stream, a first input reference signal and a first clock signal in a master clock synthesizer circuit; and generating a first output clock signal of a varying frequency by the master clock synthesizer circuit in response to the first digital data stream and the first clock signal. The method further includes receiving the first output clock signal of the master clock synthesizer circuit and a second clock signal in a slave clock synthesizer circuit; generating a second output clock signal of a varying frequency by the slave clock synthesizer circuit in response to the first output clock signal of the master clock synthesizer circuit and the second clock signal; and transmitting the second output clock signal of the slave clock synthesizer circuit to the master clock synthesizer circuit as the first input reference signal.

In still yet another aspect, the invention relates to a fault-tolerant spread spectrum clocking apparatus. In one embodiment the invention includes a first process controller configured to generate a first digital data stream having a plurality of values; a first clock synthesizer circuit in data communication with the process controller, wherein the first clock synthesizer circuit further comprises a first data control port configured to receive the first digital data stream and generate a series of formatted data values in response to the first digital data stream, and a first core clock synthesizer circuit configured to receive a first input reference signal, the series of formatted data values and a first clock signal and generate an output clock signal of a varying frequency within a predetermined range of frequency values in response to the series of formatted data values and the first clock signal. The apparatus also includes a second clock synthesizer circuit, wherein the second clock synthesizer circuit further comprises a second data control port, and a second core clock synthesizer circuit configured to receive the first output clock signal and a second clock signal and generate a varying second output clock signal in response to the first output clock signal and the second clock signal, wherein the first clock synthesizer circuit is further configured to receive the second output clock signal as the first input reference signal.

BRIEF DESCRIPTION OF THE DRAWINGS

These embodiments and other aspects of this invention will be readily apparent from the detailed description below and the appended drawings, which are meant to illustrate and not to limit the invention, and in which:

FIG. 1A is a block diagram of another exemplary fault tolerant and spread spectrum clocking system in accordance with another embodiment of the present invention;

FIG. 2 is a flow-chart illustrating an exemplary fault tolerant and spread spectrum clocking method in accordance with an embodiment of the present invention; and FIG. 3 is a more detailed block diagram of the exemplary fault-tolerant and spread spectrum clocking system in accordance with an embodiment of the present invention.

DETAILED DESCRIPTION OF THE EMBODIMENTS

Figure 1:
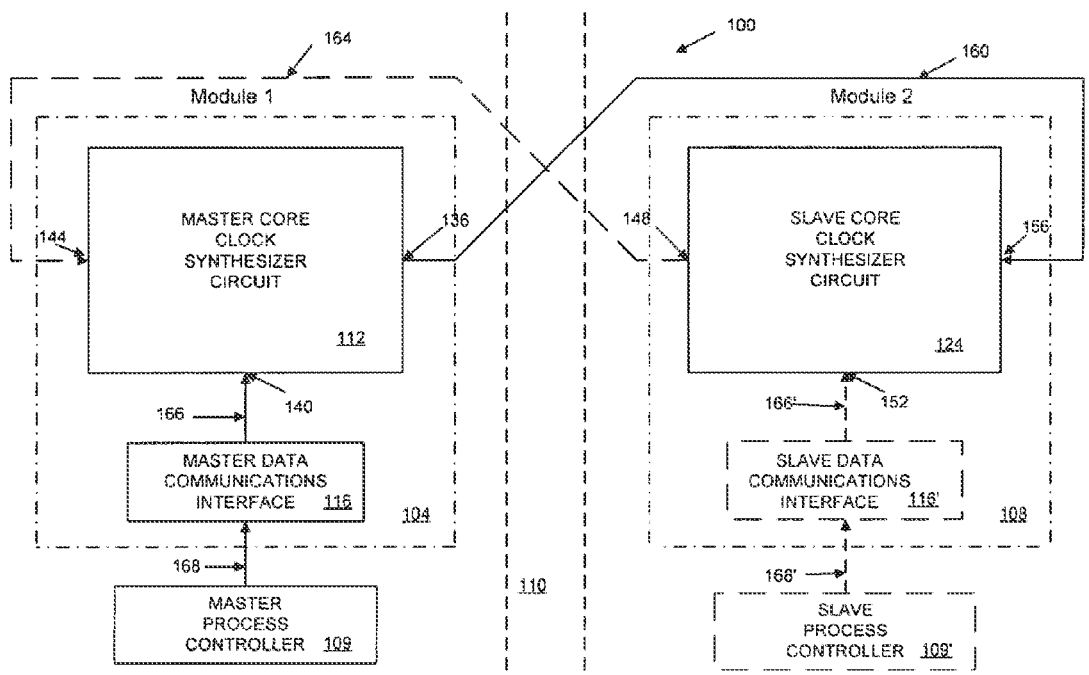
FIG. 1 is a block diagram of an exemplary fault tolerant and spread spectrum clocking system in accordance with an embodiment of the present invention.

The present invention will be more completely understood through the following detailed description, which should be read in conjunction with the attached drawings. In this description, like numbers refer to similar elements within various embodiments of the present invention. Within this detailed description, the claimed invention will be explained with respect to preferred embodiments. However, the skilled artisan will readily appreciate that the methods and systems described herein are merely exemplary and that variations can be made without departing from the spirit and scope of the invention.

Embodiments of an apparatus and methods for a fault-tolerant redundant and spread spectrum clocking are described. An embodiment of the present invention relates generally to a master clock synthesizer circuit that is programmed to generate an output clock signal. In such an embodiment, a slave clock synthesizer circuit is provided to track the output clock signal generated by the master clock synthesizer circuit. Accordingly, if the master clock synthesizer circuit fails or generates an invalid output clock signal, the slave clock synthesizer circuit takes over and functions as the master clock synthesizer circuit.

Another embodiment of the present invention relates generally to a method of fault-tolerant and redundant spread spectrum clocking by connecting a pair of clock synthesizer circuits. Accordingly, the method provides for the generation of an output clock signal of varying frequency within a predetermined range of frequency values by a first clock synthesizer circuit. A second clock synthesizer circuit closely tracks the output clock signal of the first clock synthesizer circuit. In the event the first clock synthesizer circuit fails or generates an invalid output clock signal, the second clock synthesizer circuit takes over the function of the first clock synthesizer circuit. The output clock signal of varying frequency may vary constantly. Thus in various embodiments the system is a fault tolerant redundant clocking system if the output frequency is held constant and a fault tolerant redundant spread spectrum system if the output frequency varies over time.

FIG. 1 is a block diagram of an exemplary fault tolerant redundant and spread spectrum clocking system 100 in accordance with an embodiment of the present invention. The clocking system 100 includes a first subsystem module 104, a second subsystem module 108 and a master process controller 109 interconnected over a backplane 110. In an embodiment of the present invention, the first subsystem module 104 includes a master core clock synthesizer circuit 112 and a master data communications interface 116. In various embodiments of the present invention, the second subsystem module 108 includes a slave core clock synthesizer circuit 124 which, in various embodiments, is substantially identical to the master core clock synthesizer circuit 112. Further, the master core clock synthesizer circuit 112 includes a master output clock port 136, a master data communications port 140 and a master reference input port 144. The slave core clock synthesizer circuit 124 includes a slave reference input port 156.

In another embodiment of the present invention, the clocking system 100 further includes a slave process controller 109' (shown in phantom). The second subsystem module 108 includes a slave data communications interface 116' (also shown in phantom). Accordingly, the slave core clock synthesizer circuit 124 further includes a slave data communications port 152 and a slave output clock port 148. In various embodiments, the slave data communications interface 116' and the slave process controller 109' perform substantially the same function in the second subsystem module 108 that the master data communications interface 116 and the master process controller 109 perform in the first subsystem module 104.

In various embodiments of the present invention, the clocking system 100 is implemented by a redundant, fault-tolerant hardware design. Accordingly, the clocking system 100 is configured to achieve high availability by using redundant components and data paths to ensure uninterrupted operation. In an embodiment of the present invention, the clocking system 100 is implemented using dual-mode redundancy (DMR) hardware architecture. In such an embodiment, the first and second subsystem modules 104, 108 of the clocking system 100 are configured to execute substantially identical data instruction streams substantially simultaneously.

In the event of a failure or an invalid operation, the faulty first subsystem module 104 is immediately isolated and the second subsystem module 108 takes over operation without memory data loss or application interruption. In such an embodiment, the faulty first subsystem module 104 is further replaced while the clocking system 100 remains online.

Those skilled in the art will readily recognize that various fault-tolerant redundant configurations are implemented in the clocking system 100. For example, referring to FIG. 1A, in another embodiment of the present invention, a triple-mode redundant (TMR) configuration is employed involving a third redundant subsystem module 108' substantially similar to the first or second subsystem module 104, 108 respectively included with the first and second subsystem modules 104, 108 in the clocking system 100. In this embodiment, the master core clock synthesizer circuit 112, includes a second reference input 144', that is configured to receive the output 148' of the second slave core clock synthesizer circuit 124'. The output line 160 of the master core clock synthesizer circuit 124 is the reference input 156, 158 for both slave core clock synthesizers 124, 124', respectively. Similarly the output port 148 of the slave core clock circuit 124 is connected to an output line 164 that is in communication with the second reference input 144 of the master core clock synthesizer circuit 112 and the second reference input 158' of the second slave core clock synthesizer circuit 124'. Finally the output port 148' of the second slave core clock circuit 124' is connected to an output line 165 that is in communication with the first reference input 144' of the master core clock synthesizer circuit 112 and the second reference input 156' of the slave core clock synthesizer circuit 124. Accordingly, all three subsystem modules are configured to execute substantially identical data instruction streams substantially simultaneously.

In an embodiment of the present invention, the first or second subsystem module 104, 108 is implemented on a printed circuit board (PCB), a circuit part, or an assembly unit. In such an embodiment, the first or second subsystem module 104, 108 is quickly and easily removed and/or replaced in the clocking system 100.

In another embodiment of the present invention, the first or second subsystem module 104, 108 of the clocking system 100 is implemented as a plug-in component or electronic equipment. Accordingly, the first or second subsystem module 104, 108 is replaced by a qualified technician or a user without having to send the entire product or system to a repair facility. In some embodiments, one or more indicator lights are employed to display the status of the first or second subsystem module 104, 108. Subsequently, the first or second subsystem module 104, 108 of the clocking system 100 is configured for diagnosis and may be removed with power applied without interrupting services.

In an embodiment of the present invention, both the first and second subsystem module 104, 108 of the clocking system 100 are designated as customer replaceable units (CRU). In such an embodiment, the defective first or second subsystem module 104, 108 is removed and replaced by a user or an agent of the user. In another embodiment of the present invention, the first or second subsystem module 104, 108 is designated as a field replaceable unit (FRU) or a distributor replaceable unit (DRU). Accordingly, the first or second subsystem module 104, 108 is replaced in situ by a qualified technician or sent to a distributor's repair facility for removal and/or replacement.

In various embodiments of the present invention, different combinations of the master process controller 109, the master core clock synthesizer circuit 112 and the master data communications interface 116 are designated as being independent replaceable units within the first subsystem module 104. For example, the master clock synthesizer circuit 112 and the master data communications interface 116 are together deemed highly sensitive to a critical single point of failure. Accordingly, the master core clock synthesizer circuit 112 and the master data communications interface 116 are designated as being a separate replacement unit for repair or replacement purposes within the first subsystem module 104. Subsequently, the master process controller 109 is designated as a distinct subsystem module, or included in a different subsystem module with other components.

The master and slave core clock synthesizer circuits 112, 124 are implemented using identical single or dual input network clock generator/synchronizer circuits. In various embodiments of the present invention, the master and slave core clock synthesizer circuits 112, 124 are implemented using clock chip technology from Analog Devices, Inc., Norwood, Mass., such as, for example, the AD9549. Accordingly, the master and slave core clock synthesizer circuits 112, 124 are implemented using two identical AD9549 chips cross-connected and located back-to-back in CRUs connected through the backplane 110.

In an embodiment of the present invention, the master core clock synthesizer circuit 112 is further configured to generate a master output clock signal on line 160. In various embodiments of the present invention, the master output clock signal on line 160 is generated in response to a clock signal as described in further detail below.

In various embodiments of the present invention, the master and slave core clock synthesizer circuits 112, 124 are configured to enable a stable holdover period. As a result, in the event of a failure, indefinite, potentially unlimited additional time is available to restore the reference signal at the master and slave reference input ports 144, 156 respectively. For example, in one embodiment, if the master output clock signal on line 160 received at the slave reference input port 156 fails, the slave core clock synthesizer circuit 124 continues to "hold" the output frequency indefinitely until the master output clock signal on line 160 is recovered. In some embodiments, there is a time limit to the holdover period. Accordingly, the operation of the remaining master or slave core clock synthesizer circuits 112, 124 is sustained until the clocking system 100 is powered down and/or a new reference input signal is provided.

The master process controller 109 is configured to monitor and control the various parameters of the master core clock synthesizer circuit 112 such as, for example, temperature, power mode and system status. The master process controller 109 is further configured to generate a data instruction stream on line 168 based on the parameters of the master core clock synthesizer circuit 112. In an embodiment of the present invention, the data instruction stream on line 168 generated by the master process controller 109 is adapted to load data into a set of registers within the master core clock synthesizer circuit 112.

In various embodiments of the present invention, the data instruction stream on line 168 generated by the master process controller 109 is further adapted to control the frequency of the master output clock signal on line 160 generated by the master core clock synthesizer circuits 112. Those skilled in the art will readily recognize that the data instruction stream on line 168 generated by the master process controller 109 is a digital data stream of address and data bits generated in response to a stored set of instructions or program code.

In some embodiments of the present invention, the master process controller 109 is implemented by a baseboard management controller (BMC) or a specialized microcontroller or agent. Accordingly, in one embodiment, the master process controller 109 is connected through the backplane 110.

The master process controller 109 is further implemented using one or more architecture management specifications known to those skilled in the art. For example, in one embodiment, the master process controller 109 is implemented in an intelligent platform management interface (IPMI) specification. Accordingly, system administrators can manage the clocking system 100 remotely.

In various embodiments of the present invention, system administrators interact with the master process controller 109 even in the absence of the operating system or the system management software. The master process controller 109 is configured to monitor various sensors in the backplane 110 and send alerts to system administrators. Accordingly, system administrators communicate remotely with the master process controller 109 to take corrective action such as resetting or power cycling the clocking system 100.

The master data communications interface 116 is configured to provide serial or parallel interfacing with the master core clock synthesizer circuit 112. Accordingly, the master data communications interface 116 employs a 2-wire mode and an optional chip select.

In some embodiments of the present invention, the master core clock synthesizer circuit 112 and the master data communications interface 116 are included in a single chip. For example, the AD9549 chip technology further includes a serial port interface having three pins, a serial clock pin (SCLK), a serial data input/output pin (SDIO) and a chip select bar pin (CSB).

Those skilled in the art will readily recognize that many kinds of communications interfaces are adopted by the master data communications interface 116. In an embodiment of the present invention, the master data communications interface 116 is further configured to generate a formatted data value on line 166 in response to the data instruction stream on line 168 received from the master process controller 109. In an embodiment of the present invention, the formatted data value on line 166 is then transmitted to the master core clock synthesizer circuit 112 through high-speed serial communications lines.

In operation, the master process controller 109 generates the data instruction stream on line 168. The master process controller 109 then transmits the data instruction stream on line 168 to the master data communications interface 116. The master data communications interface 116 generates the formatted data value on line 166 in response to the data instruction stream on line 168.

In various embodiments of the present invention, the master core clock synthesizer circuit 112 generates the master output clock signal on line 160 in response to the formatted data value on line 166 and a clock signal. The clock signal is used to determine the sampling rates of the digital to analog converter in the synthesizer circuit 112. In some embodiments, the formatted data value on line 166 is adapted to alter the frequency and/or the slew rate of the master output clock signal on line 160. By constantly writing a different, for example increasing, data value on line 166 the output clock signal constantly increases or slews in frequency. The rate at which the changing data value is written, determines the frequency slew rate.

In another embodiment of the present invention, the slave core clock synthesizer circuit 124 generates a slave output clock signal on line 164 (shown in phantom) in response to the master output clock signal on line 160. In such an embodiment, the master core clock synthesizer circuit 112 receives the slave output clock signal on line 164 at the master reference input port 144, but is programmed to ignore the input for clocking purposes. In some embodiments the master core clock synthesizer circuit 112 utilizes the received clock signal from the slave 124 as an indication of the slave's proper functioning.

In sonic embodiments, the slave process controller 109' (shown in phantom) included in the clocking system 100 generates the data instruction stream on line 168'. The slave process controller 109' then transmits the data instruction stream on line 168' to the slave data communications interface 116'. The slave data communications interface 116' generates the formatted data value on line 166' in response to the data instruction stream on line 168'. Accordingly, the slave core clock synthesizer circuit 124 generates the slave output clock signal on line 164 in response to the formatted data value on line 166' and the master output clock signal on line 160.

Referring also to FIG. 2, shown is a flow-chart illustrating an exemplary fault tolerant spread spectrum clocking method 300 in accordance with an embodiment of the present invention. In step 304, the master process controller 109 generates the data instruction stream on line 168. In various embodiments of the present invention, the master process controller 109 generates the data instruction stream on line 168 in response to one or more user or software triggered events. In some embodiments, the master process controller 109 generates the data instruction stream on line 168 in response to the execution of a stored set of instructions. In step 308, the master data communications interface 116 receives the data instruction stream on line 168. In step 312, the master data communications interface generates the formatted data value on line 166 in response to the data instruction stream on line 168.

In step 316, the master core synthesizer circuit 112 receives the formatted data value on line 166 and a clock signal. In step 320, the master core clock synthesizer circuit 112 generates the master output clock signal on line 160 based on the formatted data value on line 166 and the clock signal. In various embodiments of the present invention, the formatted data value on line 166 is further adapted to alter the frequency and/or the slew rate of the master output clock signal on line 160 to achieve a spread spectrum effect. In other embodiments, the frequency is altered constantly.

In step 324, the slave core synthesizer circuit 124 receives the master output clock signal on line 160 generated by the master core clock synthesizer circuit. In various embodiments of the present invention, the slave core synthesizer circuit 124 receives the master output clock signal on line 160 at the slave reference input port 156. In step 328, the slave core clock synthesizer circuit 124 verifies the validity of the master output clock signal on line 160. In step 332, if the master output clock signal on line 160 is deemed invalid, the slave core clock synthesizer circuit 124 takes over the function of the master core clock synthesizer circuit 112.

In another embodiment of the present invention, the exemplary fault tolerant redundant and spread spectrum locking method 300 further includes optional steps 336-340. As shown, in optional step 336, the slave core clock synthesizer circuit 124 further generates the slave output clock signal on line 164. Accordingly, the slave output clock signal on line 164 is adapted to track closely the master output clock signal on line 160 generated by the master core clock synthesizer circuit 112.

In optional step 340, the slave core clock synthesizer circuit 124 further transmits the slave output clock signal on line 164 to the master reference input port 144 of the master core clock synthesizer circuit 112. In an embodiment of the present invention, the master core clock synthesizer circuit 112 verifies the validity of the slave output clock signal on line 164 to ensure that the slave core clock synthesizer circuit 124 is accurately tracking the master output clock signal on line 160.

In another embodiment, the master core synthesizer circuit 112 employs the slave output clock signal on line 164 to recover from a minor error without needing to invoke the failover mode. The master core clock synthesizer circuit 112 is programmed to ignore the slave output clock signal on line 164 received at the master reference input port 144 for purposes of clocking, but can be used to check whether the slave is functioning.

FIG. 3 is a more detailed block diagram of the exemplary fault-tolerant redundant spread spectrum clocking system 100 in accordance with an embodiment of the present invention. The clocking system 100 includes redundant subsystem modules 104, 108 and the master process controller 109. The first subsystem module 104 of the clocking system 100 further encodes a master clock synthesizer circuit 204 and a master crystal oscillator circuit 202. Similarly, the second subsystem module 108 of the clocking system 100 includes a slave clock synthesizer circuit 208 and a slave crystal oscillator circuit 202'.

As shown, each of the master clock synthesizer circuit 204 and the slave clock synthesizer circuit 208 further includes system clock multiplier units 206, 206' (generally 206), serial port I/O logic units 210, 210' (generally 210), processing units 212, 212' (generally 212), and filter circuits 214, 214' (generally 214).

The master and slave crystal oscillator circuits 202, 202' respectively are configured to supply stable frequency clock signals for sampling by digital to analog converter (DAC) of the processing units 212, 212' of the master and slave clock synthesizer circuits 204, 208. In some embodiments of the present invention, system clock multiplier units 206 are employed in the master or slave clock synthesizer circuit 204, 208 to generate a higher speed by increasing the base output of the crystal oscillator circuits 202. Accordingly, processing unit clock signals on lines 230, 230' respectively (generally 230) are generated by the master and slave system clock multiplier units 206. In various embodiments of the present invention, the frequencies of the processing unit clock signals on lines 230 are adapted to optimize the clocking characteristics of the master and slave clock synthesizer circuit 204, 208.

For example, if the output frequency of the master crystal oscillator circuit 202 is 200 Megahertz, and the desired input frequency for the master slave clock synthesizer circuit 204 is one gigahertz, the master system clock multiplier unit 206 is configured to increase the output clock signal from the crystal oscillator circuit 202 to five times the output frequency of the master crystal oscillator circuit 202 to achieve the desired speed. As a result, the processing unit clock signal on line 230 generated by the master system clock multiplier unit 206 has five times the frequency of the output of the master crystal oscillator circuit 202.

The serial port I/O logic units 210 of the master and slave clock synthesizer circuits 204, 208 are configured to provide digital interfaces for the master and slave clock synthesizer circuits 204, 208 respectively. In various embodiments of the present invention, the serial port I/O logic units 210 are serial communications ports that are configured to interface synchronously with many industry-standard microcontrollers and microprocessors.

Those skilled in the art will readily recognize that the serial port I/O logic units 210 are implemented using any standard serial interface. In various embodiments of the present invention, the serial port I/O logic unit 210 in the master clock synthesizer circuit 204 is further configured to generate a spread spectrum control signal on line 234 in response to the data instruction stream on line 168 from the master process controller 109.

The processing units 212, 212' (generally 212) include a digital phase locked loop (PLL) core and holdover circuits. In an embodiment of the present invention, the digital PLL circuits of the PLL core and holdover circuits are provided in the processing unit 212, 212' of the master and slave clock synthesizer circuits 204, 208 respectively to address reference signal jitter. In various embodiments of the present invention, the digital PLL circuits of the PLL core and holdover circuits are further configured to employ a frequency estimator to lock on to an estimation of the frequency of the master output clock signal on line 160 received at the slave reference input port 156. In some embodiments, the phase lock control loop in the digital PLL circuits of the PLL core and holdover circuits is rendered inoperative during the estimation process.

In an embodiment of the present invention, holdover circuits in the PLL core and holdover circuits are provided in the processing unit 212, 212' of the master and slave clock synthesizer circuits 204, 208, respectively to maintain the master and slave output clock signals on lines 160, 164 respectively even in the absence of a reference signal at the slave reference input port 156.

The reference monitoring and switching circuits are provided in the processing unit 212, 212' of the master and slave clock synthesizer circuits 204, 208 respectively to issue an alert when the master or slave output clock signals 160, 164 are not present at either or both the master or slave reference input ports 144, 156.

In some embodiments the PLL core and holdover circuits in the processing circuit 212 in the master clock synthesizer circuits 204 is further configured to lock on to the reference signal in the event of a temporary error in the master clock synthesizer circuit 204. For example, in the event of a minor glitch in the data instruction stream on line 168 generated by the master process controller 109, the master clock synthesizer circuit 204 temporarily locks on to the reference signal on line 144 to recover lockstep operation and prevent any further failure of the master clock synthesizer circuit 204.

In other embodiments of the present invention, the reference monitoring and switching circuit of the processing unit 212 is configured to issue an alert when the slave output clock signal 164 is invalid or not present at the master reference input port 144. Accordingly, system administrators can take corrective action to ensure that the slave clock synthesizer circuit 208 is accurately tracking the master output clock signal on line 160.

In operation, the serial port I/O logic unit 210 in the master clock synthesizer circuit 204 generates the spread spectrum control signal on line 234 in response to the data instruction stream on line 168. The system clock multiplier unit 206 transmits the processing unit clock signal on line 230 to the processing unit 212 in the master clock synthesizer circuit 204.

The PLL core and holdover circuit in the processing unit 212 in the master clock synthesizer circuit 204 enables clock output drivers in the processing unit 212 to produce the master output clock signal on line 160 based on the spread spectrum control signal on line 234 and the processing unit clock signal on line 230. In various embodiments of the present invention, the processing unit clock signal on line 230 is further adapted to constantly vary the frequency of the master output clock signal on line 160 to achieve spread spectrum effect.

The slave clock synthesizer circuit 208 receives the master output clock signal on line 160 at the slave reference input port 156. The reference monitoring and switching circuit of the processing unit 212 in the slave core clock synthesizer circuit 124 further verifies the validity of the master output clock signal on line 160 generated by the master clock synthesizer circuit 204.

In some embodiments of the present invention, the slave clock synthesizer circuit 208 further generates the slave output clock signal on line 164 (shown in phantom). The reference monitoring and switching circuit in the processing unit 212 in the master clock synthesizer circuit 204 verifies the validity of the slave output clock signal on line 164 to ensure that the slave core clock synthesizer circuit 124 is accurately tracking the master output clock signal on line 160.

In various embodiments of the present invention, the clocking system 100 comprises multiple modules connected by one or more communications media. Communications media generally comprises any medium capable of carrying information signals. For example, communications media comprises wired communications media, wireless communications media, or a combination of both, as desired for a given implementation. Examples of wired communications media include a wire, cable, printed circuit board (PCB), backplane, semiconductor material, twisted-pair wire, co-axial cable, fiber optics, and so forth. An example of a wireless communications media includes portions of a wireless spectrum, such as the radio-frequency (RF) spectrum. Accordingly, the embodiments are not limited in this context.

The modules comprise, or are implemented as, one or more systems, sub-systems, devices, components, circuits, logic, programs, or any combination thereof, as desired for a given set of design or performance constraints. For example, the modules comprise electronic elements fabricated on a substrate. In various implementations, the electronic elements are fabricated using silicon-based IC processes such as complementary metal oxide semiconductor (CMOS), bipolar, and bipolar CMOS (BiCMOS) processes. Accordingly, the embodiments are not limited in this context Unless specifically stated otherwise, it is to be appreciated that terms such as "processing", "determining", or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices.

The foregoing description of the various embodiments of the present invention is provided to enable any person skilled in the art to make and use the invention and its embodiments. Various modifications to these embodiments are possible, and the generic principles presented herein may be applied to other embodiments as well.

While the invention has been described in terms of certain exemplary preferred embodiments, it will be readily understood and appreciated by one of ordinary skill in the art that it is not so limited and that many additions, deletions and modifications to the preferred embodiments may be made within the scope of the invention as hereinafter claimed. Accordingly, the scope of the invention is limited only by the scope of the appended claims.

What is claimed is:

1. A method of fault-tolerant clocking comprising the steps of:
   generating, by a first process controller, a first digital data value;
   receiving the first digital data value, a first input reference signal and a first clock signal in a master clock synthesizer circuit;
   generating a first output clock signal of a predetermined frequency by the master clock synthesizer circuit by converting the first digital data value to the first output clock signal at a conversion rate determined by the first clock signal;
   receiving the first output clock signal of the master clock synthesizer circuit and a second clock signal in a slave clock synthesizer circuit;
   generating a second output clock signal by the slave clock synthesizer circuit in response to the first output clock signal of the master clock synthesizer circuit and the second clock signal; and
   transmitting the second output clock signal of the slave clock synthesizer circuit to the master clock synthesizer circuit as the first input reference signal.

2. The method of claim 1, further comprising the step of verifying validity of the first output clock signal of the master clock synthesizer circuit.

3. The method of claim 2, further comprising the step of performing a function of the master clock synthesizer circuit by the slave clock synthesizer circuit, if the first output clock signal is deemed invalid.

4. The method of claim 1, further comprising the step of performing a function of the master clock synthesizer circuit by the slave clock synthesizer circuit, if the master clock synthesizer circuit fails.

5. The method of claim 1, further comprising the step of tracking the first output clock signal of the master clock synthesizer circuit by a second slave clock circuit.

6. The method of claim 1, wherein the step of generating a first output clock signal of a predetermined frequency by the master clock synthesizer circuit is further in response to the first input reference signal.

7. The method of claim 1, further comprising the step of generating, by a second process controller, a second digital data value.

8. The method of claim 7, wherein the first process controller is a first baseboard management controller and the second process controller is a second baseboard management controller.

9. The method of claim 1, further comprising the step of receiving a second digital data stream in the slave clock synthesizer circuit.

10. The method of claim 9, wherein the step of generating a second output clock signal by the slave clock synthesizer circuit is further in response to the second digital data stream.

11. The method of claim 1, wherein the frequency of the first output clock signal varies within a predetermined range of frequencies.

12. The method of claim 1, further comprising the steps of generating, by a first crystal oscillator, the first clock signal and generating, by a second crystal oscillator, the second clock signal.

13. A fault-tolerant clocking apparatus comprising:
a first clock synthesizer circuit configured to receive a first input reference signal, a first digital data value and a first clock signal and, in response to the first clock signal, the first clock synthesizer circuit determining a rate of conversion of the first digital data value into a first output clock signal of a predetermined frequency, and a second clock synthesizer circuit in data communication with the first clock synthesizer circuit configured to receive the first output clock signal of the first clock synthesizer circuit and a second clock signal and generate a second output clock signal in response to the first output clock signal and the second clock signal, wherein the first clock synthesizer circuit is further configured to receive the second output clock signal as the first input reference signal.

14. The apparatus of claim 13, wherein the second clock synthesizer circuit is further configured to verify validity of the first output clock signal of the first clock synthesizer circuit.

15. The apparatus of claim 14, wherein the second clock synthesizer circuit is further configured to perform a function of the first clock synthesizer circuit, if the first output clock signal is deemed invalid.

16. The apparatus of claim 13, wherein the second clock synthesizer circuit is further configured to perform a function of the first clock synthesizer circuit, if the first clock synthesizer circuit fails.

17. The apparatus of claim 13, further comprising a first process controller configured to generate the first digital data value and a second process controller configured to generate a second digital data value.

18. The apparatus of claim 17, wherein the second clock synthesizer circuit is further configured to receive the second digital data value.

19. The apparatus of claim 18, wherein the second clock synthesizer circuit is further configured to generate the second output clock signal in response to the second digital data value.

20. The apparatus of claim 13, wherein the first clock synthesizer circuit is further configured to generate the first output clock signal of a predetermined frequency in response to the first input reference signal.

21. The apparatus of claim 13, wherein the frequency of the first output clock signal varies within a predetermined range of frequencies.

22. The apparatus of claim 13, further comprising a first crystal oscillator configured to generate the first clock signal and a second crystal oscillator configured to generate the second clock signal.

* * * * *